(12) United States Patent
Kim et al.

(10) Patent No.: US 8,793,725 B2
(45) Date of Patent: Jul. 29, 2014

(54) SYSTEM AND METHOD FOR DATA TRANSMISSION IN DLNA NETWORK ENVIRONMENT

(71) Applicant: Samsung Electronics Co., Ltd., Gyeonggi-do (KR)

(72) Inventors: Chul Seung Kim, Seoul (KR); Yun Je Oh, Gyeonggi-do (KR); Joon Oo Kim, Gyeonggi-do (KR); Wong Sang Kwon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/741,489

(22) Filed: Jan. 15, 2013

(65) Prior Publication Data

US 2013/0133018 A1    May 23, 2013

Related U.S. Application Data

(62) Division of application No. 12/331,578, filed on Dec. 10, 2008, now abandoned.

(30) Foreign Application Priority Data

Dec. 11, 2007    (KR) .......................... 10-2007-0128215

(51) Int. Cl.
*H04N 7/10* (2006.01)
*H04N 7/025* (2006.01)

(52) U.S. Cl.
USPC ................................ 725/32; 725/78; 725/118

(58) Field of Classification Search
None
See application file for complete search history.

(56) References Cited

U.S. PATENT DOCUMENTS

| 6,937,599 | B1 | 8/2005 | Yoshida et al. |
| 2003/0120673 | A1 | 6/2003 | Ashby et al. |
| 2005/0160457 | A1 | 7/2005 | Rui et al. |
| 2005/0183120 | A1 | 8/2005 | Jain et al. |
| 2006/0010482 | A1 | 1/2006 | Li |
| 2007/0237090 | A1 | 10/2007 | Kim et al. |
| 2007/0255755 | A1 | 11/2007 | Zhang et al. |
| 2007/0258474 | A1 | 11/2007 | Kim et al. |
| 2008/0052261 | A1 * | 2/2008 | Valenci ............................ 707/1 |
| 2008/0127289 | A1 | 5/2008 | Julia et al. |
| 2009/0019458 | A1 * | 1/2009 | Katari et al. .................. 719/328 |

FOREIGN PATENT DOCUMENTS

| KR | 10-0744473 B1 | 8/2007 |
| KR | 10-2007-0101000 A | 10/2007 |

* cited by examiner

Primary Examiner — Jason J Chung
(74) Attorney, Agent, or Firm — Cha & Reiter, LLC.

(57) ABSTRACT

A system and method for data transmission in a DLNA network environment are disclosed. The data transmission system includes a content creation unit creating at least one content, a content correlation check unit checking a created content to classify the created content by category and a conversion content creation unit extracting header information and body information of the classified content and converting the extracted information into preset type information.

18 Claims, 3 Drawing Sheets

SYSTEM AND METHOD FOR DATA TRANSMISSION IN DLNA NETWORK ENVIRONMENT

CROSS REFERENCE TO RELATED APPLICATION

This application a divisional application of U.S. patent Ser. No. 12/331,578 filed on Dec. 10, 2008 which claims the benefit of the earlier filing date, pursuant to 35 USC 119, to that patent application entitled "SYSTEM AND METHOD FOR DATA TRANSMISSION IN DLNA NETWORK ENVIRONMENT" filed in the Korean Intellectual Property Office on Dec. 11, 2007 and assigned Serial No. 2007-0128215, the contents of which are incorporated herein by reference.

BACKGROUND OF THE INVENTION

1. Field of the Invention

The present invention relates to data transmission in a Digital Living Network Alliance (DLNA) network environment and, more particularly, to a system and method for data transmission in a DLNA network environment wherein created content is classified by category and the classified content are converted into common-format contents and can be provided as a single unified file.

2. Description of the Related Art

In recent years, a growing number of audio/video (AV) content such as songs and videos have been exchanged through Internet Protocol (IP) networks. For example, viewing television programs or listening to songs through the Internet is now regarded as a matter of course. Home users tend to exchange AV contents through networks. Users have a growing interest in home networks, which connect various home AV appliances together for easy enjoyment of AV contents. To achieve this, various automation mechanisms are necessary. Connecting home appliances to LAN interfaces or providing wireless LAN features to the home appliances is not enough. The home appliances must be aware of the presence of other appliances, discover necessary content and exchange desired contents, through networks.

Various middleware-related standards such as UPnP, HaVi, Jini, VESA and DLNA are employed to discover other appliances on networks, and find and exchange desired content through the networks.

In particular, DLNA focuses on sharing of all types of contents provided by various appliances such as a TV, VCR, digital camera and audio system. Content sharing requires interoperability between appliances. A network in the home connecting an Internet network (PC and printer), mobile network (PDA, mobile phone and notebook) and home appliance network (TV, audio system and DVD player) together should conform to a standardized interoperability framework and satisfy operability requirements for products.

DLNA aims to enable consumers to acquire digital media contents (for example, photographs, songs and videos) from mobile devices or personal devices such as PCs, and to distribute and manage them. That is, DLNA aims to enable a consumer to conveniently enjoy media content irrespective of the locations and appliances in the home.

To achieve this, a DLNA system is based on Universal Plug and Play (UPnP) technology, and can be a wired/wireless network system including Digital Media Server (DMS) devices, Digital Media Player (DMP) devices, Digital Media Controller (DMC) devices, and Digital Media Renderer (DMR) devices.

The DMS devices, DMP devices, and DMC devices include mobile DMS (M-DMS) devices, mobile DMP (M-DMP) devices, and mobile (M-DMC) devices, respectively. M-DMS, M-DMP and M-DMC devices can be connected directly or through access points (AP) to the DLNA system. A Mobile Network Connectivity Function (M-NCF) device is present at an AP as an intermediate node connecting an M-DMS device and M-DMP device together.

The DLNA system can employ a wired network (IEEE 802.3) or wireless network (IEEE 802.11) to compose a home network. DMS, DMP and DMR devices on the home network are interconnected through the wired network or wireless network. Digital devices on the home network can transmit data such as images and voices through the IEEE 1394 interface.

For standardization of DLNA systems, the DLNA Networked Device Interoperability Guidelines define the Home Network Device category including DMS devices, DMP devices, DMC devices and DMR devices, and provide conditions for interoperability between DMS, DMP, DMC and DMR devices.

A DMS device, corresponding to a media server device (MSD) in the UPnP AV model, has functions to access and store digital media content and provide them to DMR devices. The DMS device is to permit a control point (CP) acting as a user interface application to discover digital media content in the DMS device so that users of a DLNA network can display or distribute the content. As an example of interaction between a DMS device and DMR device in digital broadcast reception, the DMS device receives and stores broadcast programs, and then sends a requested broadcast program to the DMR device, in response to a request from the DMR device. The DMR device then reproduces the received broadcast program. The DMP device is a DMR device including a UPnP CP, and acts as a Media Renderer Device (MRD) and Media Renderer Control Point (MRCP) for selecting and controlling media contents and playing back selected contents. Media contents provided through the DMS device to the DMP device and DMR device have been received from various sources in various ways.

As described above, media content provided through a DMS device have various data formats. To play back a media content of a particular format, a home appliance has to install a required application. If the required application cannot be installed, the home appliance cannot play back the media content.

The content providing service of the DMS device is limited to reception and reproduction of media content files selected by the CP. Hence, it is necessary to provide an extended service that enables the CP to discover and access media content files in various and convenient manners.

SUMMARY OF THE INVENTION

The present invention provides a system and method for data transmission in a DLNA network environment wherein the format of media content is converted into a preset format for transmission to increase the diversity in content usage and facilitate searching of media contents.

In accordance with an exemplary embodiment of the present invention, there is provided a data transmission system in a DLNA network environment, including a content creation unit creating at least one content, a content correlation check unit checking a created content to classify the created content by category; and a conversion content creation unit extracting header information and body information of the content classified by category and converting the extracted information into preset type information.

In accordance with an exemplary embodiment of the present invention, there is provided a data transmission method in a DLNA network environment, including: creating at least one content; classifying a created content by checking the category of the content and extracting header information and body information of the content classified by category and header information, and converting the extracted information into preset type information.

In a feature of the present invention, various content in a DLNA network environment are classified by category, the format of classified content is converted into a common format, and closely related content is provided as a single unified file. Hence, the user can easily find and receive contents.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

Figure 1:
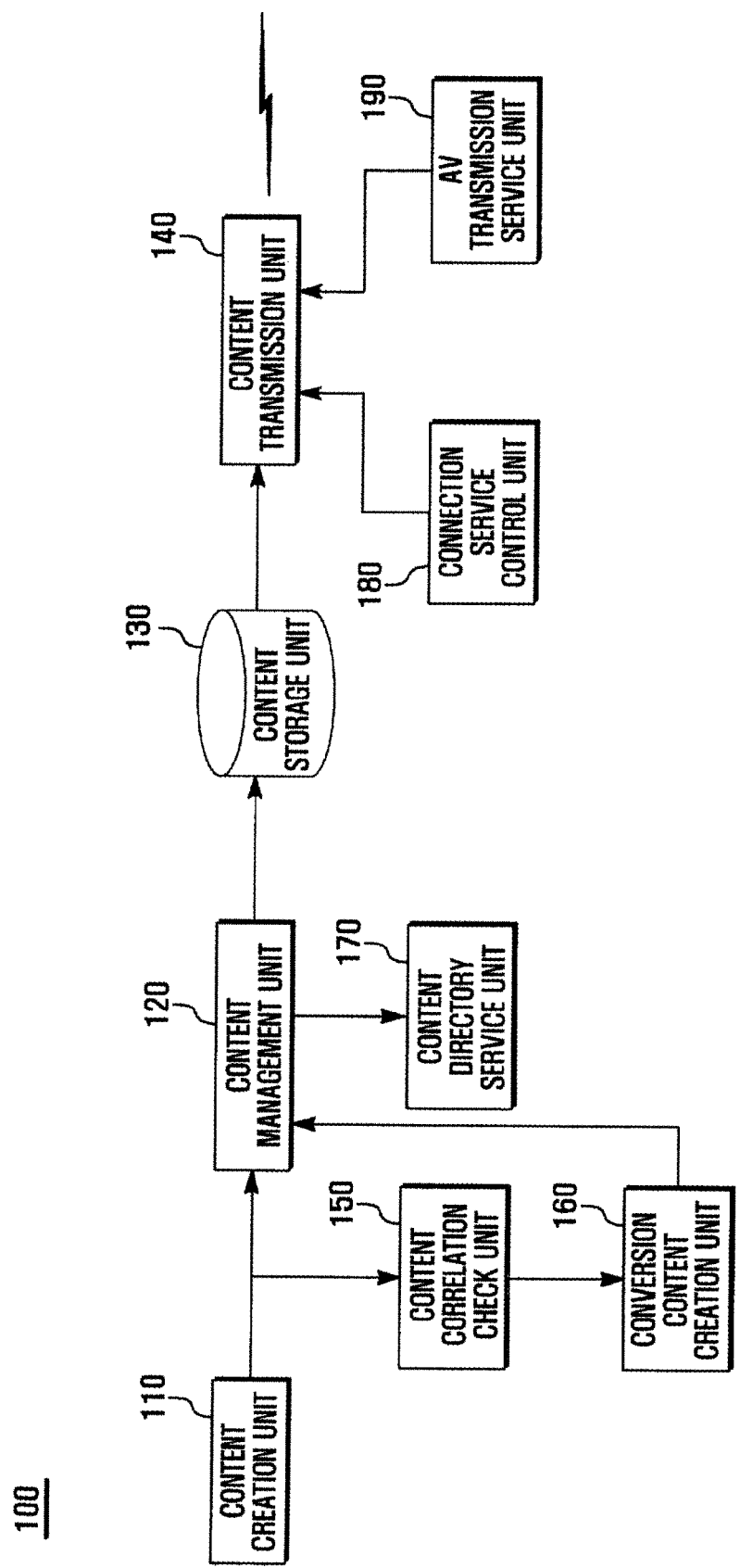
FIG. 1 is a block diagram illustrating a digital media server of a DLNA network according to an exemplary embodiment of the present invention.

FIG. 1 is a block diagram illustrating a digital media server (DMS) 100 of a DLNA network according to an exemplary embodiment of the present invention.

Referring to FIG. 1, the DMS 100 includes a content creation unit 110, content management unit 120, content storage unit 130, content transmission unit 140, content correlation check unit 150, conversion content creation unit 160, content directory service unit 170, connection service control unit 180, and AV transmission service unit 190. The content directory service unit 170, connection service control unit 180, and AV transmission service unit 190 are supplementary components.

The content creation unit 110 directly creates content or captures a broadcast stream. The content creation unit 110 can process a content received through the network from another DMS to create a new content. The content creation unit 110 sends created content to the content management unit 120 and content correlation check unit 150.

The content management unit 120 manages content created by the content creation unit 110. The content management unit 120 can also manage converted content from the conversion content creation unit 160. The content management unit 120 sends content from the content creation unit 110 and converted content from the conversion content creation unit 160 to the content storage unit 130. The content management unit 120 can send content or converted content to the content directory service unit 170.

The content storage unit 130 stores contents from the content creation unit 110 and also stores converted contents from the conversion content creation unit 160. Preferably, the content storage unit 130 stores content or converted content in accordance with the classification of the content. The content transmission unit 140 transmits content or converted content stored in the content storage unit 130 through the network to a user terminal. The user terminal can be a home appliance connected to the DLNA network. In particular, the content transmission unit 140 can provide a two-way communication interface to a user terminal. That is, when a user terminal is connected, the content transmission unit 140 may provide a list of available converted content to the user terminal, and may then send only selected items of the list (or all items in the list) to the user terminal. To be more specific, available converted content can be categorized into image content and audio content, and the image content and audio content can be further classified by various indexes. The converted content list can further include lists of indexed items (files). Hence, the user terminal can obtain information regarding lists of playable content using the converted content list. The user terminal can specify one of file lists in the converted content list, or specify a group of files by selecting indexes and categories.

The content correlation check unit 150 examines the class of a content created by the content creation unit 110, and sends the content together with its class information to the conversion content creation unit 160. The content correlation check unit 150 can determine the class of a content by categories and indexes. To be more specific, the content correlation check unit 150 determines which category (for example, audio or image) to which a content created by the content creation unit 110 belongs. If the content belongs to the image content category, the content correlation check unit 150 further classifies the content according to various indexes such as location (for GPS data), time (year, month, day and hour), and character (for photographs). If the content belongs to the audio content category, the content correlation check unit 150 further classifies the content according to various indexes such as album, genre and singer.

The conversion content creation unit 160 converts the format of a content into a common format on the basis of the classification result of the content correlation check unit 150. A content in the common format can be utilized by various home appliances connected to the DLNA network. The common format may be a MPEG-4 format or Multimedia Application Format (MAF) format. Conversion of content formats is described in connection with FIG. 2.

The content directory service unit 170 provides a service based on the UPnP AV model, and sends a content list to external devices for providing content information. That is, the content directory service unit 170 creates a list of content or converted content managed by the content management unit 120, and sends the created list to the content storage unit 130 and content transmission unit 140 through the content management unit 120.

The connection service control unit 180 provides a service based on the UPnP AV model, and manages connection of an appliance to the DMS 100. That is, the connection service control unit 180 manages connections between the DMS 100 and devices on the DLNA network including a home appliance, DMP device and DMC device.

The AV transmission service unit 190 provides a service based on the UPnP AV model, and manages the transmission of content. That is, when the DMS 100 supports a full control service for content including features such as, play, stop and pause, the AV transmission service unit 190 manages the transmission of the content being sent.

As described above, the DMS 100 converts the format of a created content into a common format according to the category of the content. Hence, when a home appliance connected to the DLNA network already has an application for playback of MPEG-4 or MAF content, the home appliance can play back the converted content without additional application installation or download. For content transmission, the DMS 100 sends content classified according to the categories and indexes, and permits selection of files to be sent on a group basis. Hence, files in a particular group can be received, stored, and reproduced without selection of an individual file.

Figure 2:
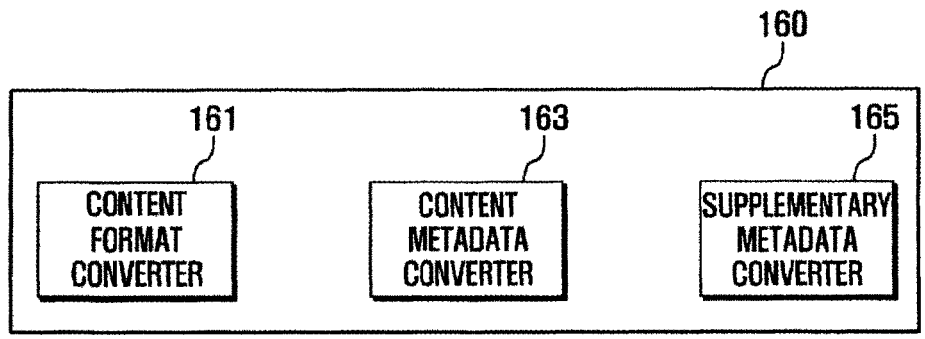
FIG. 2 is a block diagram of a conversion content creation unit in the digital media server of FIG. 1.

FIG. 2 is a block diagram of the conversion content creation unit 160 in the DMS 100.

Referring to FIG. 2, the conversion content creation unit 160 includes a content format converter 161, content metadata converter 163, and supplementary metadata converter 165.

The content format converter 161 converts the format of content into a known format (e.g., MPEG-4 or MAF format). The content format converter 161 converts the format of a content created by the content creation unit 110 into the known format regardless of the content type. Here, the MPEG-4 format and MAF format is used for substantial compatibility and are not the only formats that are contemplated as being within the scope of the invention. It would be recognized by those skilled in the art, that the MPEG-4 and MAF formats are only used herein to describe the principles of the invention. Thus, when a content is composed of a header part, body part and supplementary part, for example, the content format converter 161 converts the format of details in the body part (the substance of the content) into the exemplary MPEG-4 format or MAF format.

The content metadata converter 163 converts the format of metadata of content into the well-known MPEG-7 Multimedia Description Scheme (MDS) format, which need not be described in herein. That is, the content metadata converter 163 extracts metadata from content created by the content creation unit 110, and converts the format of the extracted metadata into the MPEG-7 MDS format. For example, when content is composed of a header part, body part and supplementary part, the content metadata converter 163 extracts metadata, i.e., information stored in the header part to define the body part and describe property of the content, from the header part, and converts the format of the extracted metadata into the MPEG-7 MDS format. In addition to the MPEG-7 MDS format, the format of metadata may also be converted into the MPEG-4 format or MAF format.

The supplementary metadata converter 165 provides supplementary metadata to content created by the content creation unit 110. If the content belongs to the audio content category, the supplementary metadata converter 165 can generate supplementary metadata, including information regarding a photograph associated with a song, album, or album cover, or information regarding Exchangeable Image file format (EXIF) for a photograph.

Next, content conversion by the conversion content creation unit 160 is described in connection with FIGS. 3 and 4.

Figure 3:
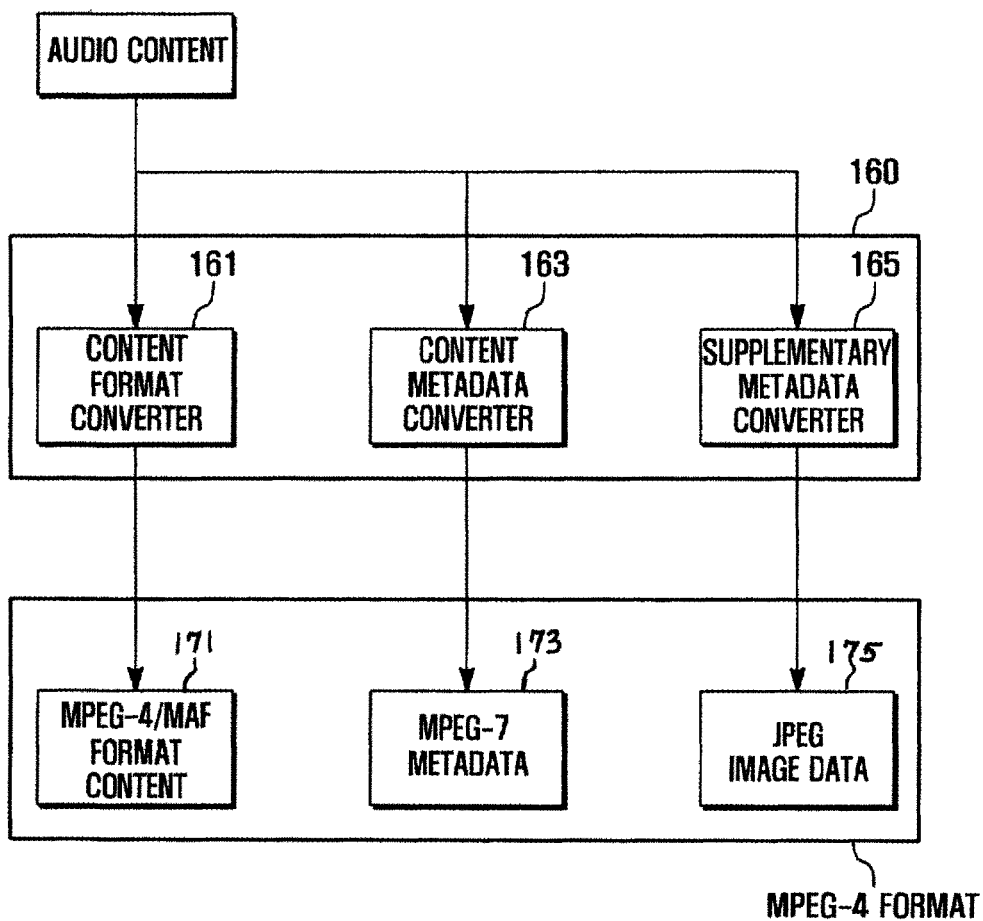
FIG. 3 illustrates conversion of an audio content in accordance with the principles of the present invention.

FIG. 3 illustrates conversion of an audio content by the conversion content creation unit 160. In the description, an audio content includes at least a header part, a body part, and a supplementary part. However, the audio content may further include a part necessary for an application. That is, it should be understood that an audio content includes an information part to store primary material data of the content, a metadata part to store data defining and describing the primary material data, and a supplementary part to store data further describing the content. In the description provided herein, an MP3 file is described as an audio content. However, it would be recognized that other audio formats may be applied to the conversion unit 160.

Referring to FIG. 3, the conversion content creation unit 160 forwards an audio content created by the content creation unit 110 to the content format converter 161, content metadata converter 163, and supplementary metadata converter 165. The conversion content creation unit 160 subdivides information in the audio content by type into distinct segments, which are then given to suitable modules. For example, when the audio content includes a header part storing metadata, body part defined by the header part and a supplementary part storing supplementary data, the conversion content creation unit 160 extracts information stored in the header part (for example, IDv3 tag information in relation to MP3 format) and sends the extracted information to the content metadata converter 163. In addition, the conversion content creation unit 160 extracts information stored in the body part (i.e. audio streams) and sends the extracted information to the content format converter 161, and extracts information described as supplementary data (for example, album arts/cover/photograph) in the supplementary part and sends the extracted information to the supplementary metadata converter 165.

Thereafter, the content format converter 161 converts the audio stream of the body part into an elementary stream in the exemplary MPEG-4 or MAF format. The content metadata converter 163 converts metadata of the header part into metadata in the exemplary MPEG-7 format conforming to the conversion result of the content format converter 161. That is, the metadata in the MPEG-7 format describes the content converted by the content format converter 161. When the audio content includes supplementary data describing the content, e.g., image or text information, the supplementary metadata converter 165 converts the supplementary data into image data in an exemplary MPEG-4 compatible format. For example, the supplementary metadata converter 165 can convert the supplementary data of the audio content into JPEG image data based on MPEG-4.

Hence, using the content format converter 161, content metadata converter 163 and supplementary metadata converter 165, the conversion content creation unit 160 can produce an MPEG-4 format content composed of an MPEG-4 or MAF type body 171, MPEG-7 metadata 173, and JPEG image data 175, respectively. Here, the JPEG image data is supplementary, and can be created and added according to the policy of the DMS 100 if present in the audio content.

In the description above, an audio content with a single track may be converted into an MPEG-4 type content. When an audio content includes multiple tracks, the conversion content creation unit 160 converts the audio content into a MAF type content with multiple tracks. In other words, to compose related audio contents as a single file, the conversion content creation unit 160 can package converted content as a single file using MPEG-21 Digital Item Declarations (MPEG-21 DID).

For playback of a converted content from the conversion content creation unit 160, the MPEG-7 metadata of the content is extracted and output through a display device. For the content body part, MP3 bit stream fragments are extracted from MP3-on-MP4 bit streams and reproduced through an existing MP3 player. For a JPEG still image in the content, the JPEG still image is extracted and decoded through a JPEG decoder, and the decoded signal is rendered through the display device.

Figure 4:
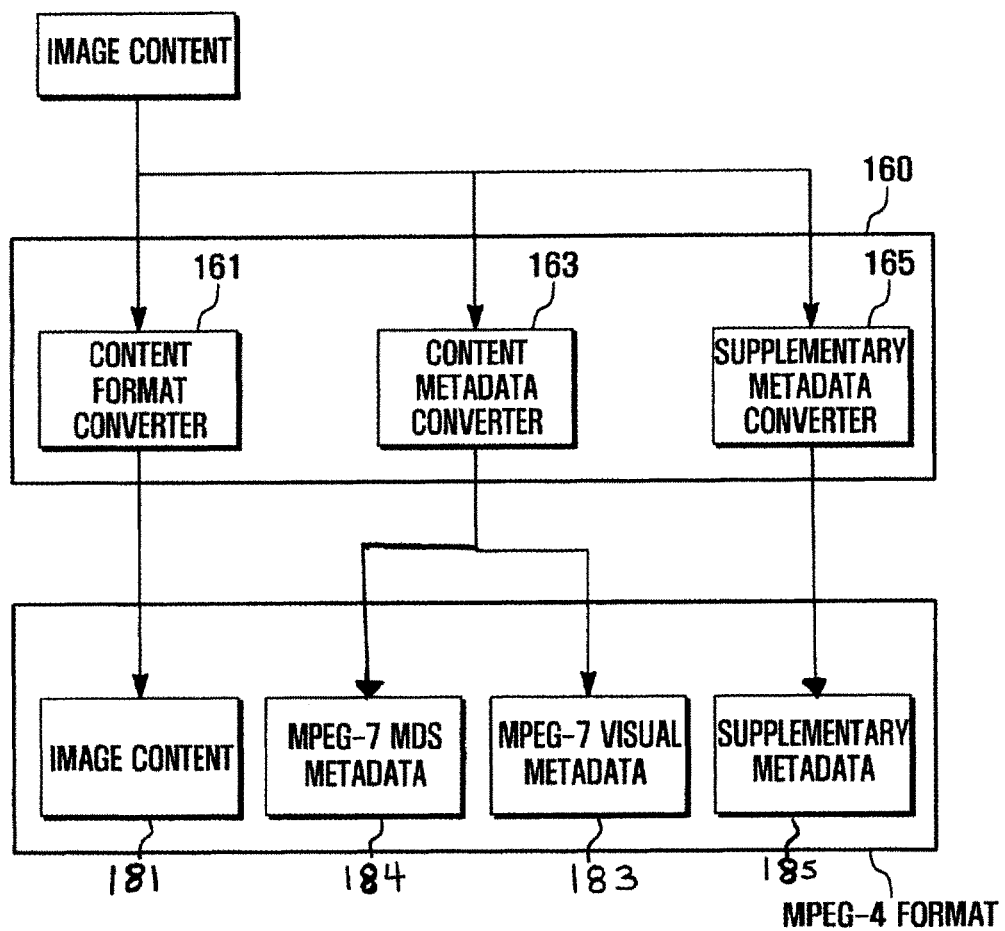
FIG. 4 illustrates conversion of an image content in accordance with the principles of the present invention.

FIG. 4 illustrates conversion of an image content by the conversion content creation unit 160.

Referring to FIG. 4, for an image content, the conversion content creation unit 160 extracts image information from the body part of the image content 181, metadata from the header part 183, 184, and supplementary metadata from the supplementary part 185, respectively. For example, for a JPEG file, the conversion content creation unit 160 creates MPEG-7 metadata on the basis of the image data, and extracts supplementary metadata on the basis of EXIF information. The conversion content creation unit 160 converts extracted image information, MPEG-7 MDS metadata based on EXIF information, MPEG-7 visual metadata, and visual information in the image such as color, texture and shape data into MPEG-4 or MAF type data. Here, the conversion content creation unit 160 can convert header information into one of MPEG-7 MDS metadata 184 and MPEG-7 visual metadata 193 depending upon the property of the header information. That is, if visual information of the image is present in the header part of the image content, the conversion content creation unit 160 can convert header information into MPEG-7 visual metadata 183.

When multiple related image contents are combined into a file, the conversion content creation unit 160 can package the multiple image contents in a container, which can be stored like a single file.

As described above, in the digital media server (DMS) of an embodiment of the present invention, a content created by the content creation unit 110 is classified by category and indexes, and converted into a converted content in a particular format such as the MPEG-4 or MAF format according to the classification result. The DMS can store various classified contents, and provide information regarding these contents using a converted content list through the content directory service unit to a user terminal such as a home appliance connected to the DLNA network. Hence, the user of a home appliance can readily search the converted content list for a desired content and related information. In addition, for multiple related contents, the user can utilize a converted content in the form of a single file, and does not have to select and playback one file at a time.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A data transmission system in a Digital Living Network Alliance (DLNA) network environment, comprising:
    a content creation unit creating at least one content;
    a content correlation check unit checking the at least one created content to classify the at least one created content by category; and
    a conversion content creation unit extracting header information and body information of each of the at least one classified content, converting the extracted information into preset type information, and combining multiple related contents having a common media format into a single unified computer file;
    wherein converting the extracted information includes converting at least some of the extracted header information into one of a first type of metadata and a second type of metadata in dependence upon whether visual information is present in the extracted header information, the visual information including color, texture, and shape data.

2. The data transmission system of claim 1, wherein the content correlation check unit classifies a content into an audio content or image content.

3. The data transmission system of claim 2, wherein the content correlation check unit further classifies the content classified as an audio content or image content by indexes.

4. The data transmission system of claim 2, wherein the conversion content creation unit converts the audio content header information, extracted from the content, into MPEG-7 type metadata.

5. The data transmission system of claim 2, wherein the conversion content creation unit converts the audio content body information, extracted from the content, into MPEG-4 or MAF type information.

6. The data transmission system of claim 2, wherein the conversion content creation unit converts the image content header information, extracted from the content, into one of MPEG-7 MDS metadata and MPEG-7 visual metadata.

7. The data transmission system of claim 1, wherein the conversion content creation unit:
    extracts supplementary information from the at least one created content; and
    generates supplementary metadata based on of the extracted supplementary information.

8. The data transmission system of claim 1, wherein the conversion content creation unit combines the multiple related contents having the common media format into the single unified computer file on the basis of the classification result.

9. The data transmission system of claim 8, further comprising:
    a content directory service unit creating and providing a list of content, list of converted contents, and list of unified files;
    a content storage unit storing at least one of contents, converted contents and unified files; and
    a content transmission unit transmitting at least one of contents, converted contents and unified files.

10. A method for data transmission in a Digital Living Network Alliance (DLNA) network environment, comprising:
- creating a content;
- classifying the created content by checking the category of the content;
- extracting header information and body information of the content classified by category;
- converting, by a processor, the extracted information into preset type information; and
- combining multiple related contents having a common media format into a single unified computer file;
- wherein converting the extracted information includes converting at least some of the header information into one of a first type of metadata and a second type of metadata in dependence upon whether visual information is present in the header information, the visual information including color, texture, and shape data.

11. The method of claim 10, wherein classifying a created content comprises:
- classifying the content into an audio content or an image content.

12. The method of claim 11, wherein classifying a created content further comprises:
- classifying the content classified as an audio content or image content by indexes.

13. The method of claim 11, wherein converting the extracted information comprises:
- converting an audio content header information, extracted from the content, into MPEG-7 type metadata.

14. The method of claim 11, wherein converting the extracted information comprises:
- converting body information of the audio content extracted from the content into MPEG-4 or MAF type information.

15. The method of claim 11, wherein converting the extracted information comprises:
- converting an image content header information extracted from the content into one of MPEG-7 MDS metadata and MPEG-7 visual metadata.

16. The method of claim 10, wherein extracting header information and body information further comprises:
- extracting supplementary information from a created content; and
- generating supplementary metadata based on of the extracted supplementary information.

17. The method of claim 10, wherein the combining comprises:
- combining the multiple related contents having the common media format into the single unified computer file on the basis of the classification result.

18. The method of claim 17, further comprising:
- storing the contents, converted contents and unified files;
- creating and providing a list of content, list of converted content, and list of unified files; and
- transmitting at least one of said contents, converted contents and unified files.

* * * * *

UNITED STATES PATENT AND TRADEMARK OFFICE
CERTIFICATE OF CORRECTION

| | | |
|---|---|---|
| PATENT NO. | : 8,793,725 B2 | Page 1 of 1 |
| APPLICATION NO. | : 13/741489 | |
| DATED | : July 29, 2014 | |
| INVENTOR(S) | : Chul Seung Kim et al. | |

It is certified that error appears in the above-identified patent and that said Letters Patent is hereby corrected as shown below:

On the title page

Item 72, 4th Inventor should read as follows:
--…Won Sang Kwon…--

In the claims

Column 8, Claim 7, Line 51 should read as follows:
--…metadata based on the…--

Column 10, Claim 16, Line 15 should read as follows:
--…metadata based on the…--

Signed and Sealed this
Seventh Day of October, 2014

Michelle K. Lee
*Deputy Director of the United States Patent and Trademark Office*